(12) United States Patent
Christopher

(10) Patent No.: US 7,772,976 B2
(45) Date of Patent: Aug. 10, 2010

(54) SYSTEMS AND METHODS FOR LOCATING AN ENTITY

(75) Inventor: James Christopher, La Mesa, CA (US)

(73) Assignee: Strategic Data Systems, La Mesa, CA (US)

( * ) Notice: Subject to any disclaimer, the term of this patent is extended or adjusted under 35 U.S.C. 154(b) by 242 days.

(21) Appl. No.: 11/683,903

(22) Filed: Mar. 8, 2007

(65) Prior Publication Data

US 2008/0042844 A1 Feb. 21, 2008

Related U.S. Application Data

(63) Continuation-in-part of application No. 11/505,616, filed on Aug. 16, 2006, and a continuation-in-part of application No. 11/506,179, filed on Aug. 16, 2006.

(51) Int. Cl.
*G08B 13/14* (2006.01)

(52) U.S. Cl. ............ 340/572.1; 340/573.1; 340/539.13; 235/385

(58) Field of Classification Search ... 340/572.1–572.8, 340/573.1, 573.4, 539.13; 235/385
See application file for complete search history.

(56) References Cited

U.S. PATENT DOCUMENTS

| | | | | |
|---|---|---|---|---|
| 7,002,473 | B2 * | 2/2006 | Glick et al. | 340/572.1 |
| 7,005,968 | B1 * | 2/2006 | Bridgelall | 340/10.42 |
| 7,038,573 | B2 * | 5/2006 | Bann | 340/10.1 |
| 7,100,817 | B2 | 9/2006 | Leger et al. | |
| 7,117,121 | B2 | 10/2006 | Brinton et al. | |
| 7,167,095 | B2 * | 1/2007 | Carrender | 340/572.4 |
| 7,170,407 | B2 * | 1/2007 | Wagner | 340/539.13 |
| 7,242,303 | B2 * | 7/2007 | Patel et al. | 340/572.4 |
| 7,295,114 | B1 * | 11/2007 | Drzaic et al. | 340/572.1 |
| 7,323,991 | B1 * | 1/2008 | Eckert et al. | 340/572.1 |
| 7,333,014 | B2 * | 2/2008 | Agrawal et al. | 340/539.13 |
| 7,466,232 | B2 * | 12/2008 | Neuwirth | 340/572.1 |
| 2005/0040224 | A1 | 2/2005 | Brinton et al. | |
| 2005/0164687 | A1 * | 7/2005 | DiFazio | 455/418 |

(Continued)

OTHER PUBLICATIONS

Mine Site Technologies: Tracker Tagging http://www.minesite.com.au/coal_mines_tracker_taggingc, Nov. 11, 2006.

(Continued)

*Primary Examiner*—Eric M Blount
(74) *Attorney, Agent, or Firm*—Sheppard Mullin Richter & Hampton LLP

(57) ABSTRACT

The present invention provides systems and methods for locating an entity both within and outside of a structure using an RFID system in conjunction with other location systems and methods. The RFID systems may include a portable RF transmitter/receiver transported by the entity within the structure, a base unit, and a plurality of RFID tags. The methods may comprise the steps of: (a) emitting an RF interrogation signal at constant, predetermined intervals; (b) powering up and emitting a signal containing location data; (c) receiving the location data and broadcasting the location data to the base unit; and (d) receiving and displaying the location data; wherein steps (a) and (c) are performed by the RF transmitter/receiver, step (b) is performed by an RFID tag when the RF interrogation signal is within an effective range of the RFID tag, and step (d) is performed by the base unit.

15 Claims, 10 Drawing Sheets

U.S. PATENT DOCUMENTS

| | | |
|---|---|---|
| 2005/0200476 A1 | 9/2005 | Forr et al. |
| 2005/0243784 A1* | 11/2005 | Fitzgerald et al. ........... 370/338 |
| 2006/0044141 A1 | 3/2006 | Vesikivi et al. |
| 2006/0081697 A1 | 4/2006 | Brinton et al. |
| 2006/0125694 A1* | 6/2006 | Dejanovic et al. ........... 342/463 |
| 2006/0171538 A1 | 8/2006 | Larson et al. |
| 2006/0208857 A1 | 9/2006 | Wong |
| 2009/0017944 A1* | 1/2009 | Savarese et al. ............. 473/407 |

OTHER PUBLICATIONS

Mine Site Technologies: Tracker System Gives Immediate Benefits to Kundana http://www.minesite.com.au/tracker_system_gives_immediate_benefits_to_kundana.

Miller, L.E., et al., RFID-Assisted Indoor Localization and Communication for First Responders, National Institute of Standards and Technology (NIST), Mar. 8, 2006 http://www.antd.nist.gov/wctg/RFID/RFIDassist.htm.

Miller, L.E., et al., Indoor Navigation for First Responders: A Feasibility Study, Wireless Communication Technologies Group, Advanced Networking Technologies Division, Information Technology Laboratory, National Institute of Standards and Technology, Feb. 10, 2006, http://.www.antd.nist.gov/wctg/RFID/RFIDassist.htm.

Miller, L.E., et al. FY 2005 Interim Project Report, RFID-Assisted Localization and Communication for First Responders, Oct. 25, 2005, (rev. Mar. 22, 2006), National Institute of Standards and Technology, http://www.antd.nist.gov/wctg/RFID/RFIDassist.htm.

Nokia Unveils RFID Phone Reader, Copyright 2002-2007 RFID Journal, Inc., Mar. 17, 2004, http://www.rfidjournal.com/articleview/834/1/1/.

Microsoft's Amazing Virtual Earth, dailywireless.org, SAMC, Nov. 6, 2006, http://www.dailywireless.org/2006/11/06/microsofts-amazing-virtual-earth/.

* cited by examiner

| | | | |
|---|---|---|---|
| NAME: FIREMAN #5 | | | LOG DATE: 27 JULY 2006 |
| BUILDING: ACME CORPORATE OFFICES<br>BUILDING ADDRESS: 1313 FIRST AVE.<br>NEW YORK, NY 1001 | | | |

| FLOOR | TAG# | TIME | LOCATION |
|---|---|---|---|
| 1 | 1-1 | 12:01:00 | ENTRANCE - WEST |
| 2 | 2-1 | 12:02:00 | STAIRWELL - WEST WALL |
| 3 | 3-1 | 12:03:00 | STAIRWELL - WEST WALL |
| 4 | 4-1 | 12:04:00 | STAIRWELL - WEST WALL |
| 4 | 4-50 | 12:04:10 | MAIN CORRIDOR - 50FT FROM WEST WALL |
| 4 | 4-100 | 12:04:20 | MAIN CORRIDOR - 100FT FROM WEST WALL |
| 4 | 4-150 | 12:04:30 | MAIN CORRIDOR - 150FT FROM WEST WALL |
| | | | |
| | | | |
| | | | |

190

SYSTEMS AND METHODS FOR LOCATING AN ENTITY

CROSS-REFERENCE TO RELATED APPLICATIONS

This application is (i) a continuation-in-part of U.S. patent application Ser. No. 11/505,616, filed Aug. 16, 2006, and (ii) a continuation-in-part of U.S. patent application Ser. No. 11/506,179, filed Aug. 16, 2006.

FIELD OF THE INVENTION

The present invention relates generally to systems and methods for locating an entity both within and outside of a structure and, more particularly, to systems and methods for locating an entity within and outside of a structure using RFID technology and other location technologies such as Global Positioning System ("GPS").

BACKGROUND OF THE INVENTION

Catastrophic events such as Hurricane Katrina and the attacks on the World Trade Center exposed weaknesses in emergency response systems. The primary lesson learned from these disasters is the need for a central command to know exactly where police, fire, and other first-responder personnel are located. Current emergency service agencies have access to systems to track and locate vehicles; however, these agencies lack the ability to rapidly locate an individual.

Many solutions to the problem of rapidly locating personnel have been proposed, including GPS systems, cell phone-based systems, and radio relay systems. Each of these solutions has significant limitations. Vehicle tracking systems use GPS technology with radio transmitters to geo-locate and report the position of a vehicle. In most instances, the problem is two-dimensional, wherein a vehicle is assumed to be ground level and the system needs only solve for latitude and longitude. However, in metropolitan areas, the problem is frequently three-dimensional. For example, personnel can be above ground-level in a building or below ground-level in subways, underground parking garages, mines, etc. Commercially available GPS are simply not accurate enough to precisely locate personnel in high rise buildings, and GPS signals do not reach deep under ground in subways, underground parking garages, mines, etc.

Cell phones have also been proposed as a solution for locating personnel and many cell phone manufacturers are adding GPS to their phone for this purpose. However, by incorporating GPS, this proposed solution suffers from the same limitations of any GPS solution. In addition, cell phones also suffer from signal loss or interference such as when located within buildings or when located underground (e.g., in subways). After Hurricane Katrina, much of the communication and power networks were knocked out by the storm, including many cell towers. Katrina taught us that emergency systems should be completely autonomous, such that emergency systems should not depend on cell phones or electricity from a power grid. Emergency agencies, therefore, cannot depend on cell phones as the primary means of locating personnel.

SUMMARY OF THE INVENTION

In view of the foregoing, a preferred embodiment of the present invention provides systems and methods for locating an entity both within and outside of a structure using RFID technology in combination with other tracking technologies such as GPS to allow rapid location of any entity (individual or item) on any floor in a building or deep underground such as in a subway, underground parking garage, mine, etc, as well as when the entity is outside and, for example, able to receive GPS signals. According to the systems and methods described herein, the entity is fitted with a portable RFID transmitter/receiver, while the surrounding environment will be instrumented with RFID tags. Each RFID tag may comprise a passive or active device that transmits its location to the transmitter/receiver. In turn, the transmitter/receiver transmits the location of the entity to a base unit computer which displays the location of the entity. According to one embodiment, an RFID entity locating system may continuously monitor the location of any entity that is fitted with a transmitter/receiver. (At least as long as signals from the transmitter/receiver may be received.) In this way the entity can be tracked. Further, the RFID entity location system may monitor the location of the entity(s) in real time and then display the location of the entity.

According to one embodiment of the invention, the plurality of RFID tags are disposed at predetermined intervals within a multiple story building, such that when the RF transmitter/receiver is within a range of an RF tag, the RF transmitter/receiver records an RF signal containing unique location information of the RF tag within the structure. The RF transmitter/receiver then broadcasts the location of the RF tag to the base unit computer, which maintains a log of the location of the RF tag. According to some embodiments, an RFID tag is positioned at an entrance to the structure which includes general information about the structure such as contact information for the structure, the number of floors, and possibly, a schematic of the structure. Additionally, the base unit, sometimes referred to as a base station, will maintain a base log comprising information including the identification of the entity, the name of the structure, the location of the structure, the current date, and entries for the position and time of the entity as it moves through the structure.

One embodiment of the present invention involves an RFID system for locating an entity within and outside of a structure, the system comprising a portable RF transmitter/receiver transported by the entity, a base unit, and a plurality of passive RFID tags, wherein the RF transmitter/receiver records the location of an RF tag and broadcasts the location of the RF tag to the base unit. Further, the transmitter/receiver may also include a supplemental location determination device that may be used to determine location outside of buildings. In one embodiment the supplemental location determination device may be a GPS receiver. Accordingly, location may be determined by the GPS receiver when the GPS may receive enough GPS satellite signals and by the RFID system for locating an entity when RFID tags are in range. It will be understood that, in some cases, both RFID tags and GPS satellite signals will be able to be received at the same time, while in other cases, no signals may be available.

In some embodiment of the invention, the RFID tags are passive devices that do not require AC or DC power, and each REID tag has an RF signal containing unique location information. In addition, the base unit comprises a computer including a processor, a memory, an operating system, a database, a human-machine interface (HMI), and an RF receiver that may be in the form as a PC card or a PCMCI card or with a USB interface. The portable RF transmitter/receiver unit is battery-operated.

According to one implementation of the RFID system, the plurality of RFID tags are disposed at predetermined intervals within a multiple story building, and additional RFID tags may be provided at entrances and stairwells of the building. When the RF transmitter/receiver is within a range of an RF tag, the RF transmitter/receiver records an RF signal containing unique location information of the RF tag within the structure. Then, the RF transmitter/receiver broadcasts the location of the RF tag to the base unit computer, which maintains a log of the location of the RF tag. According to other embodiments, the structure may comprise a mine or a subway.

According to another embodiment of the invention, an RFID tag located at an entrance to the structure may include general information about the structure such as the contact information for the structure, the number of floors, and a schematic of the structure. Additionally, the base unit maintains a base log comprising information including the identification of the entity, the name of the structure, the location of the structure, the current date, and entries for the position and time as the entity moves through the structure. According to some embodiments of the invention, the distance between RFID tags is predetermined based upon a standard that balances accuracy against signal load.

Another embodiment of the present invention involves a method for locating an entity within a structure using an RFID system including a portable RF transmitter/receiver transported by the entity within the structure, a base unit, and a plurality of RFID tags, the method comprising the steps of: (a) emitting an RF interrogation signal at constant, predetermined intervals; (b) powering up and emitting a signal containing RFID tag location data; (c) receiving the RFID tag location data and broadcasting the RFID tag location data to the base unit; (d) receiving and displaying the RFID tag location data; (e) determining location using a supplemental location determination device configured to provide supplemental location data; (f) broadcasting the supplemental location data to the base unit; and (g) receiving and displaying the supplemental location data; wherein steps (a), (c) and (f) are performed by the RF transmitter/receiver, step (b) is performed by an RFID tag when the RF interrogation signal is within an effective range of the RFID tag, and steps (d) and (g) are performed by the base unit.

According to the method for locating an entity within and outside of a structure, the plurality of RFID tags are disposed at predetermined intervals within a multiple story building, such that when the RF transmitter/receiver is within a range of an RF tag, the RF transmitter/receiver records the RF signal containing unique location information of the RF tag within the structure. The RF transmitter/receiver then broadcasts the location of the RF tag to the base unit computer, which maintains a log of the location of the RF tag. According to some embodiments, an RFID tag is positioned at an entrance to the structure which includes general information about the structure such as the owner of the structure, the number of floors, and a schematic of the structure. Additionally, the base unit may maintain a base log comprising information including the name of the entity, the name of the structure, the location of the structure and the current date.

In accordance with the principles of the invention, any of the systems and methods for determining location using REID may be combined with other location determination systems and methods. For example, the systems and methods described herein may also include a global positioning system ("GPS") receiver.

Other features and advantages of the present invention should become apparent from the following description of the preferred embodiments, taken in conjunction with the accompanying drawings, which illustrate, by way of example, the principles of the invention. The summary is not intended to limit the scope of the invention, which is defined solely by the claims attached hereto.

BRIEF DESCRIPTION OF THE DRAWINGS

Embodiments of the present invention will now be described, by way of example only, with reference to the following drawings, in which.

DETAILED DESCRIPTION OF THE PREFERRED EMBODIMENTS

Figure 1:
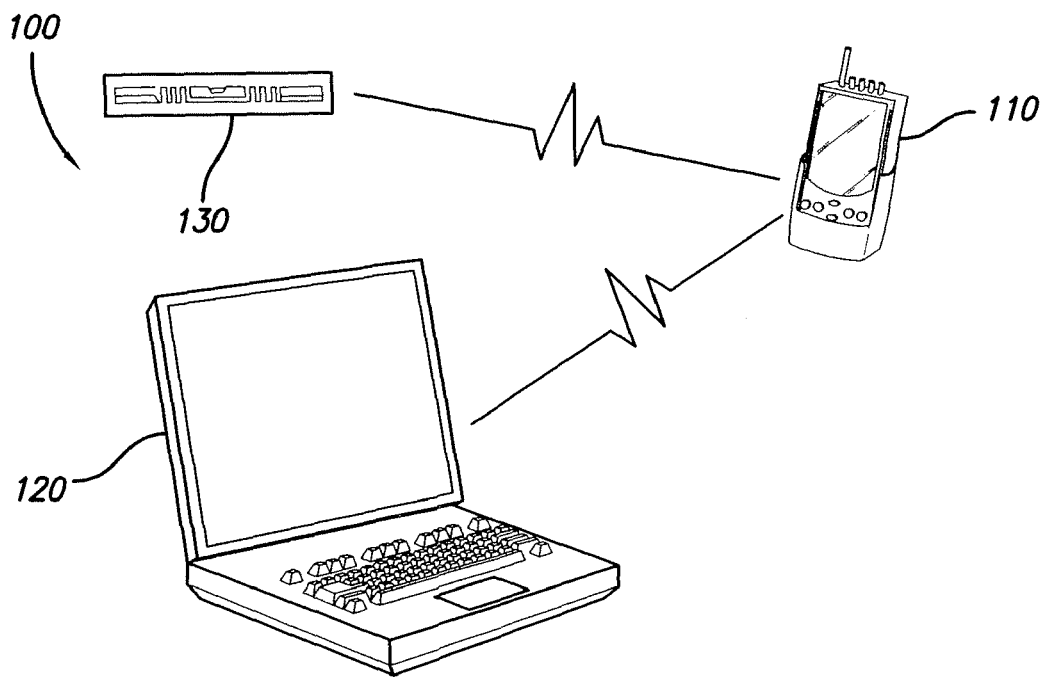
FIG. 1 is a notional illustration of an example RFID system for locating an entity within a structure, in accordance with the principles of the present invention.

Before describing the invention in detail, it is useful to describe an example environment in which the invention may be implemented.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention is directed to systems and methods for locating an entity both within and outside of a structure using an RFID system including a portable RF transmitter/receiver transported by the entity within the structure, a base unit, sometimes referred to as a base station, and a plurality of RFID tags, the method comprising: (a) emitting an RF interrogation signal at constant, predetermined intervals; (b) powering up and emitting a signal containing location data; (c) receiving the location data and broadcasting the location data to the base unit; and (d) receiving and displaying the location data; wherein steps (a) and (c) are performed by the RF transmitter/receiver, step (b) is performed by an RFID tag when the RF interrogation signal is within an effective range of the RFID tag, and step (d) is performed by the base unit. A further step may comprise storing the location information, a unique RFID tag identification, and a time of entry on the base unit.

By way of example, the entity may comprise a person or an item that is located within a structure such as a building, a subway, or a mine. More particularly, the entity is fitted with a portable RFID transmitter/receiver, and the structure is provided with a plurality of substantially stationary RFID tags. Each RFID tag may comprise a passive or active device that transmits its location to the transmitter/receiver. The transmitter/receiver then transmits the location of the entity to a base unit computer, which displays the location of the entity. In this manner, the RFID system of the invention may continuously monitor the location of any entity that is fitted with a transmitter/receiver. By continuously monitoring the location of an entity that is fitted with a transmitter/receiver, the entity may be tracked. This tracking may occur almost any time two or more locations for the same entity are determined.

Continuously monitoring the location of any entity that is fitted with a transmitter/receiver may occur at least as long as signals from the transmitter/receiver are correct and being received by the base unit computer, the base unit computer is functioning properly, etc. The continuous monitoring may occur in real time, and the exact location of the entity may then be displayed, for example, on the base computer.

In conventional systems, an RFID tag is attached to the entity such that the tag may move past a stationary RFID receiver, referred to as an "interrogator", and the system records the information from the tag. There are several proposals for use of RFID technology in buildings or for emergency personnel. Such stationary systems require installation of RFID interrogators throughout buildings to accurately track personnel locations, which may be incredibly expensive and impractical, particularly when considering that the interrogators are far more expensive than the RFID tags. In addition, the interrogators require emergency backup power when there is a loss of power to the building. In the RFID system of the present invention, the process is reversed so that a plurality of stationary RFID tags are positioned at predetermined locations throughout structures such as buildings and subways, wherein each stationary tag identifies the location of an entity within the structure. In view of the high relative cost of the conventional stationary RFID receivers, placing RFID tags throughout the building and only requiring a limited number of emergency personnel to wear an RF transmitter/receiver will result in an enormous cost savings, particularly for large structures.

Referring to FIG. 1, in accordance with the principles of the invention, an RFID system 100 for locating an entity within a structure comprises one or more portable radio frequency (RF) transmitter/receiver units 110, a base unit 120 providing a command and control function, and a plurality of passive RFID tags 130. According to other embodiments described herein, active RFID tags 130 may be employed. The base unit 120 may comprise a computer including a processor, a memory, an operating system, a database, an HMI, and an RF receiver. The RF receiver may comprise a PC card on the motherboard or a PCMCI card or with a USB interface, including interface software comprising machine readable instructions for allowing communication between the RF transmitter/receiver 110 and the base unit receiver, and then unpacking the data transmissions and load records to a database (not depicted). In one embodiment the portable RF transmitter/receiver unit 110 is battery-operated, wherein the battery life is sufficient for the duration of an operation, but not necessarily for extended periods.

According to the invention, the RF transmitter/receiver 110 may read an RFID tag 130 and thereby determine location based on the known location of the RFID tag 130. In a preferred implementation, the RF transmitter/receiver 110 may determine location information using other location determination systems and methods. For example, in the preferred embodiment of the invention, the RF transmitter/receiver 110 is capable of reading an RFID tag 130 and receiving GPS signals from GPS satellites. Generally, RFID tags 130 are used to track entities within buildings, underground, etc., while GPS is employed to determine location outside. It will be understood, however, that in certain cases GPS signals may be receivable inside (e.g., near a window), and in other cases RFID tags may be employed to determine location outside (e.g., RFID tags 130 may be attached to the exterior of buildings). Such a system may be useful in extremely dense urban areas where GPS signals may be blocked by tall buildings or interfered with by other electromagnetic signals.

Since the RFID system 100 of the invention broadcasts location data in real time, the location of the person (or entity) is recorded at the base unit 120. Using the location data, rescue personnel may be immediately directed to the real time location of the entity within a structure, and the man-portable unit does not need to continually function as a beacon. By way of example, the structure may comprise a building, subway or mine. One of ordinary skill in the art will appreciate that the RFID system 100 may be employed to locate entities within various other structures without departing from the scope of the invention.

As discussed above, the RF transmitter/receiver 110 may include a GPS receiver. The GPS receiver calculates its position by measuring the distance between itself and three or more GPS satellites. This may be done by measuring the time delay between transmission and reception of a GPS radio signal from each satellite being received. Because the signal travels at a known speed, the distance to each satellite may be determined. The signals also carry information about the satellites' location. By determining the position of, and distance to, at least three satellites, the receiver may compute its position using trilateration. Receivers typically do not have perfectly accurate clocks and therefore track one or more additional satellites to correct the receiver's clock error may be necessary.

While the supplemental location determination device will generally be GPS, other location determination systems may also be used. Further, the supplemental location determination system may be augmented by, for example, Local Area Augmentation System (LAAS), Wide Area Augmentation System (WAAS), Differential GPS (DGPS), etc. Additionally, as used herein GPS refers to the Global Navigation Satellite System (GNSS) developed by the United States Department of Defense, (NAVSTAR GPS) and any other similar GNSS, for example, Galileo, GLONASS, etc. Additionally, while the supplemental location determination system is referred to as "supplemental" it will be understood that, in some cases, it may provide location information more frequently than the RFID entity location system. Such cases include instances wherein the entity to be tracked spends more time in areas where GPS signals may be received than in areas where RFID tag signals may be received.

Figure 2:
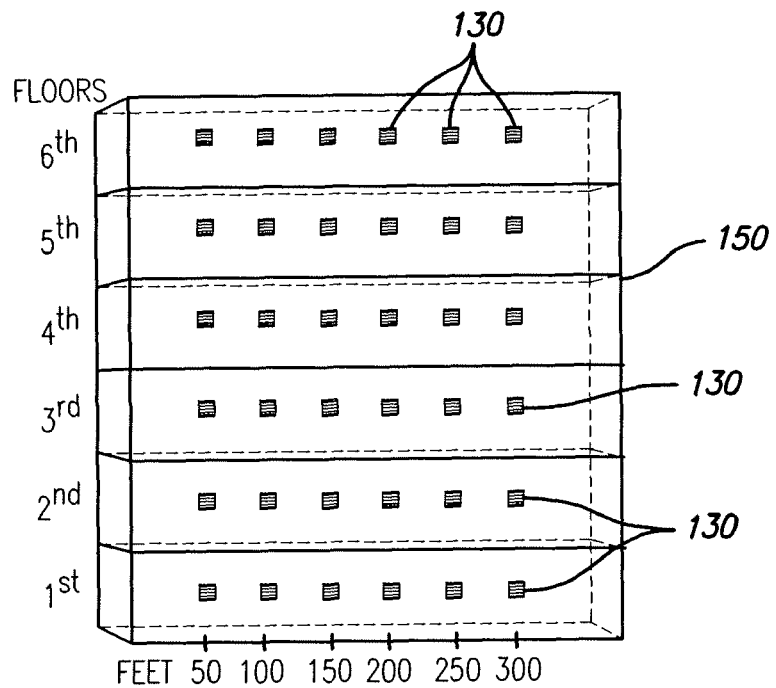
FIG. 2 is a schematic diagram illustrating an exemplary implementation of the RFID system of FIG. 1 within a six-story structure.

FIG. 2 illustrates a schematic view showing the implementation of the RFID system 100 of the invention within a six-story structure 150. Specifically, the RFID system 100 comprises a plurality of passive RFID tags 130 disposed at predetermined intervals within the six-story structure 150. In the illustrated embodiment, the passive RFID tags 130 are separated by intervals of approximately fifty feet. Additional tags 130 may be provided at other locations within the structure 150, for example at entrances, exits, stairwells, particular rooms, or every room in the structure 150. According to the invention, a standard may be developed to determine an appropriate or optimum distance between passive tags 130 for a particular structure. According to one implementation of the invention, the RFID tags 130 are passive devices such that they do not require AC or DC power, and each tag 130 has an RF signal containing unique location information. In operation, an RF transmitter/receiver (attached to an entity within the structure 150) sends a signal to an RF tag 130 and then records the RF signal of the tag 130. The R signal of the tag 130 may include unique location information. As set forth above, the RFID system 100 has many additional useful applications such as with respect to mining operations, hospitals, in underground parking garages, and other business where one needs to quickly locate people or assets, particularly during an emergency situation.

According to a further embodiment of the invention, active RFID tags 130 may be employed within the RFID system 100. In this embodiment, the base computer 120 emits an RF interrogation signal at predetermined, constant, rapid intervals. Once the base computer 120 enters the effective range of an active RFID tag 130, the active tag 130 receives the request and transmits radio waves including signals representing building data, such as the address of the building, contact information, and/or a schematic of the building. Upon receiving the building data, the base unit computer 120 stores the building data, and displays the building data on a human-machine interface ("HMI") such as a graphical user interface ("GUI"). Unlike the passive tags, the active tags of this embodiment require an AC or DC power source.

In one embodiment RFID tags may be placed within building materials. In another embodiment RFID tags may be attached to building materials during the manufacture of these materials. In yet another embodiment RFID tags may be attached during the construction of a building. In this way REID tags may be propositioned in or on building materials to expedite the installation of tags within buildings. For example, building materials that may contain tags include drywall or sheetrock, baseboards, wallpaper, fabric, plywood, concrete, stucco, or plaster. In another embodiment tags may also be placed within pre-manufactured walls and/or modular furniture during the manufacture of these items.

Figure 3:
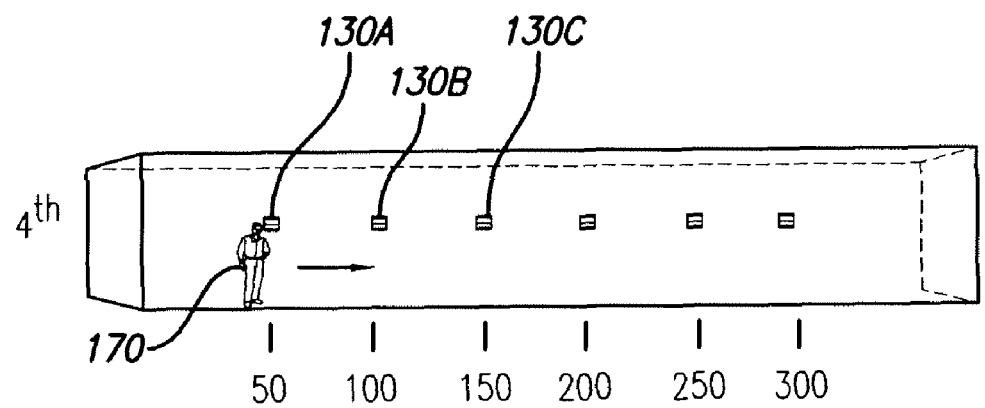
FIG. 3 is a schematic diagram illustrating the progression of a fire fighter through the structure while wearing a portable RFID transmitter/receiver.
Figure 3:
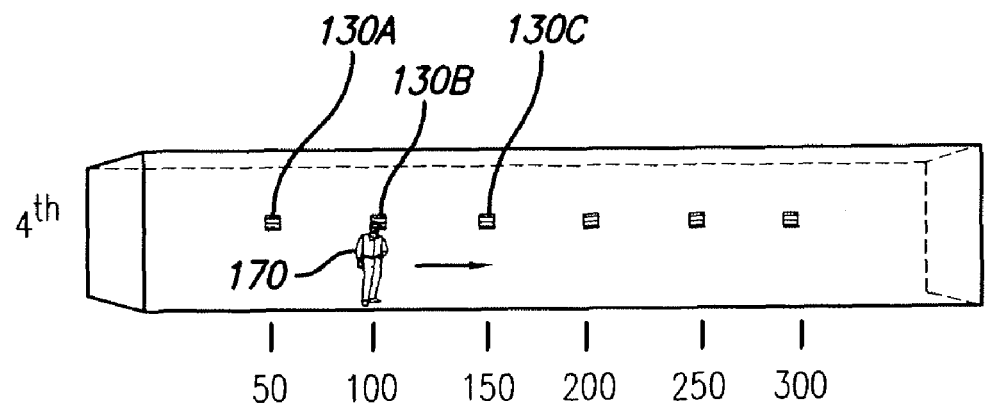
Figure 3:
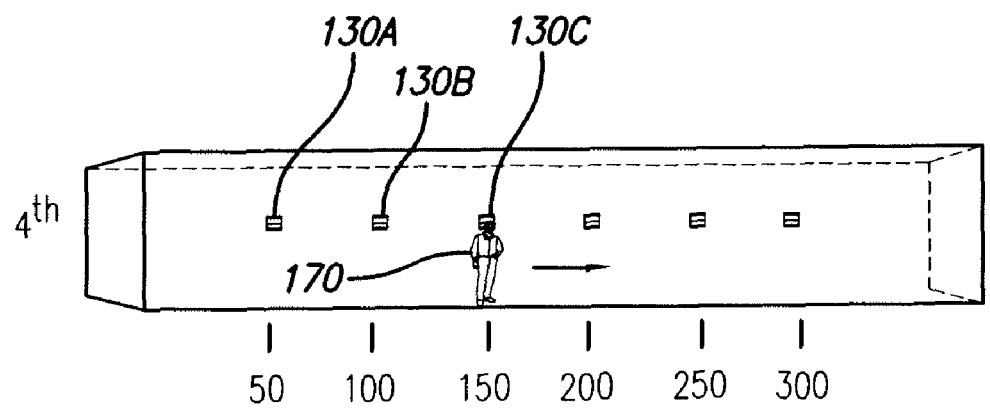

FIG. 3 is a schematic view that depicts the progression of a fire fighter 170 past the RFID tags 130, wherein the fire fighter 170 is wearing a portable RFID transmitter/receiver unit 110. As the fire fighter 170 walks past an RFID tag 130, the RF transmitter/receiver 110 records the location of the tag 130 and broadcasts the location of the tag 130 (and the fire fighter 170) to the base unit computer 120, which maintains a log of the current location of each RF transmitter/receiver 110 on an on-going basis. Locations are updated every time an RF transmitter/receiver 110 passes an RF tag 130. As such, the base unit 120 records the location of each entity (or fire fighter) that is accurate to the distance between RFID tags 130. In FIG. 3, the fire fighter 170 is illustrated as moving past RF tags 130 on the fourth floor of the structure 150 of FIG. 2. In the first frame, the fire fighter 170 passes the RFID tag 130A positioned at 50 feet from the left wall on the fourth floor of the structure. In the second frame, the fire fighter 170 walks past the tag 130B at 100 feet from the left wall. In the third frame, the fire fighter 170 passes the RFID tag 130C located 150 feet from the left wall. As the fire fighter 170 passes each RF tag 130, his personal RFID transmitter/receiver 110 records its location and forward the location to the base unit 120, which track the location in a log.

Figures 4, 5:
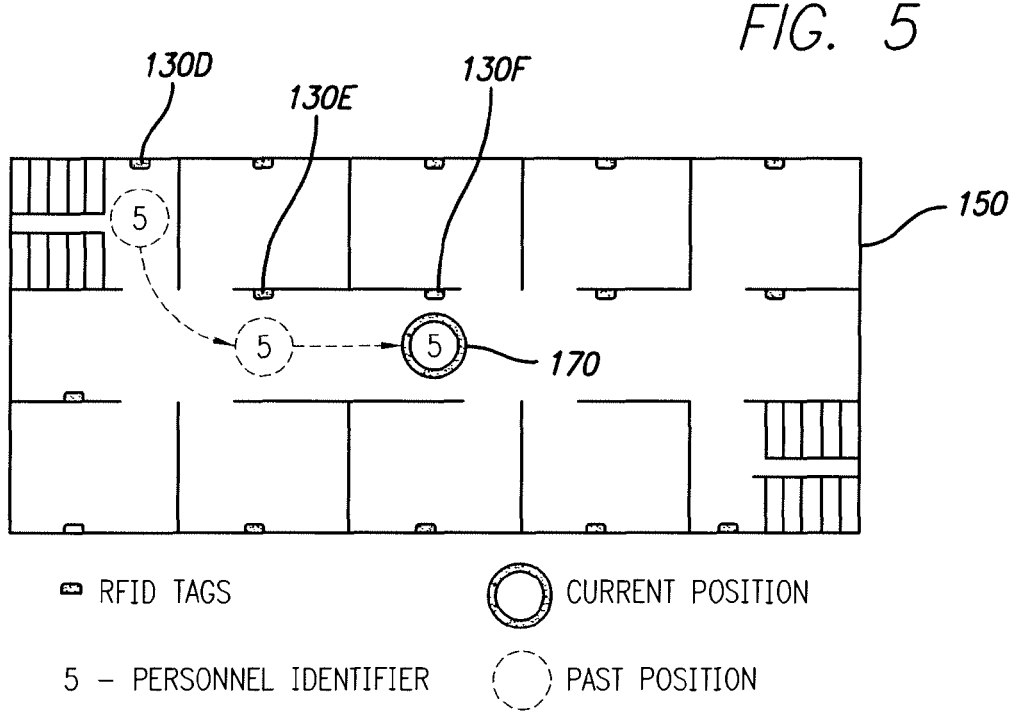
FIG. 4 illustrates a base unit log that details the fire fighter's location within the structure over time as the fire fighter moves through the structure.
FIG. 5 is a detailed sectional view of the $4^{th}$ floor of the structure illustrating the movement of the fire fighter through the structure.

FIG. 4 illustrates a base unit log 190 that details the fire fighter's location within the structure 150 over time as the fire fighter 170 moves through the structure 150. Particularly, the initial entry in the base unit log 190 was recorded as the fire fighter 170 entered the structure 150, passing an RFID tag 130 at the entrance. According to the invention, this particular entrance tag 130 may contain general information about the building such as address, the building's contact information, the building owner's contact information, the number of floors, and/or a schematic of the building. In the illustrated embodiment, the base log 190 contains information pertaining to the identification of the fire fighter 170, the contact information of the structure 150, the address of the company or companies residing in the structure 150, the entity's position and time for each log entry, and the current date. The base unit log 190 then recorded the fire fighter's locations in real time as he or she traveled to the fourth floor via the stairwell, passing several more tags 130. The fire fighter 170 then exited the stairwell on the fourth floor, and the three highlighted entries in the base unit log 190 coincide with the movement of the fire fighter 170 illustrated in FIG. 3.

According to the invention, it is anticipated that the efficacy of the RFID system 100 will dramatically increase if an entire metropolitan area adopts a set of standards and associated regulations, for example to require the installation of RF tags in all multi-story buildings, subways, and in all mines. In one embodiment, if all building owners were required to install RFID tags in a uniform manner, emergency personnel would be assured of consistency from building to building and accuracy of the location data at each specific building. By way of example, a standard for the spacing between tags may be adopted to ensure consistent data from building to building. Although greater accuracy (of locating personnel) may be realized by reducing the distance between RFID tags, this accuracy must be balance against the signal load to determine an optimum distance between tags.

FIG. 5 illustrates a detailed sectional view of the $4^{th}$ floor of the structure 150 for identifying and displaying the movement of specific personnel (e.g., the fire fighter 170) as they move through the structure 150. With the adoption of an entrance RFID tag 130, emergency personnel may download a schematic of the structure 150 to the base unit 120 to display a "Gods-eye" view of any floor of the structure 150. Once downloaded, the schematic is updated to show the movement of the fire fighter 170 every time he or she passes an RFID tag 130. In the illustrated embodiment, emergency personnel No. 5 (fire fighter 170) has recently moved from the stairwell on the $4^{th}$ floor (RFID tag 130D), past RFID tag 130E, and is currently positioned near RFID tag 130E.

The overall cost of implementing the RFID system described herein may be very reasonable when compared with conventional solutions. More particularly, the cost for the base unit computer 120 may be minimal since any standard laptop may be used, and only one base unit 120 is needed for the RFID system. The cost for the RFID transmitter/receiver units 110 will depend on how many any given agency will purchase; however, only one RFID transmitter/receiver 110 is needed for each emergency personnel or asset that is to be tracked (rather than a multiplicity of interrogators disposed throughout each building). The cost for the RFID tags 130 is usually minimal, generally considerably less than one dollar per tag 130. Again, the actual cost will depend on the quantity ordered. It is anticipated that the costs for the base unit computer 120 and the RF transmitter/receiver units 110 will likely be covered by metropolitan agencies, whereas the costs for the RFID tags 130 (with regulations to ensure compliance) may be levied on building owners. Municipalities may find that the low cost of compliance for building owners is an added benefit for city-wide implementation.

The RFID system of the invention may be implemented utilizing Commercial, Off-The-Shelf ("COTS") technology currently manufactured and sold by various companies. In particular, RFID tags and personal computers are readily available at any number of global suppliers. The base unit of the RFID system may further require a database for storing and retrieving information as well as a graphic user interface ("GUI") for displaying the retrieved information. RFID interrogators that collect the data from an RFID tag and transmit the data via cable to a computer for processing are currently available. Additionally, manufacturers currently produce hand-held interrogators that collect data, and then download the data at a later time when the interrogator is placed in a cradle connected to a computer. For the RFID system set forth herein, a new type of portable interrogator is necessary that is capable of transmitting the recorded data to the base unit in real time. In one embodiment the unit is battery-operated, portable, as light weight as possible, and protected from the elements.

Figure 6:
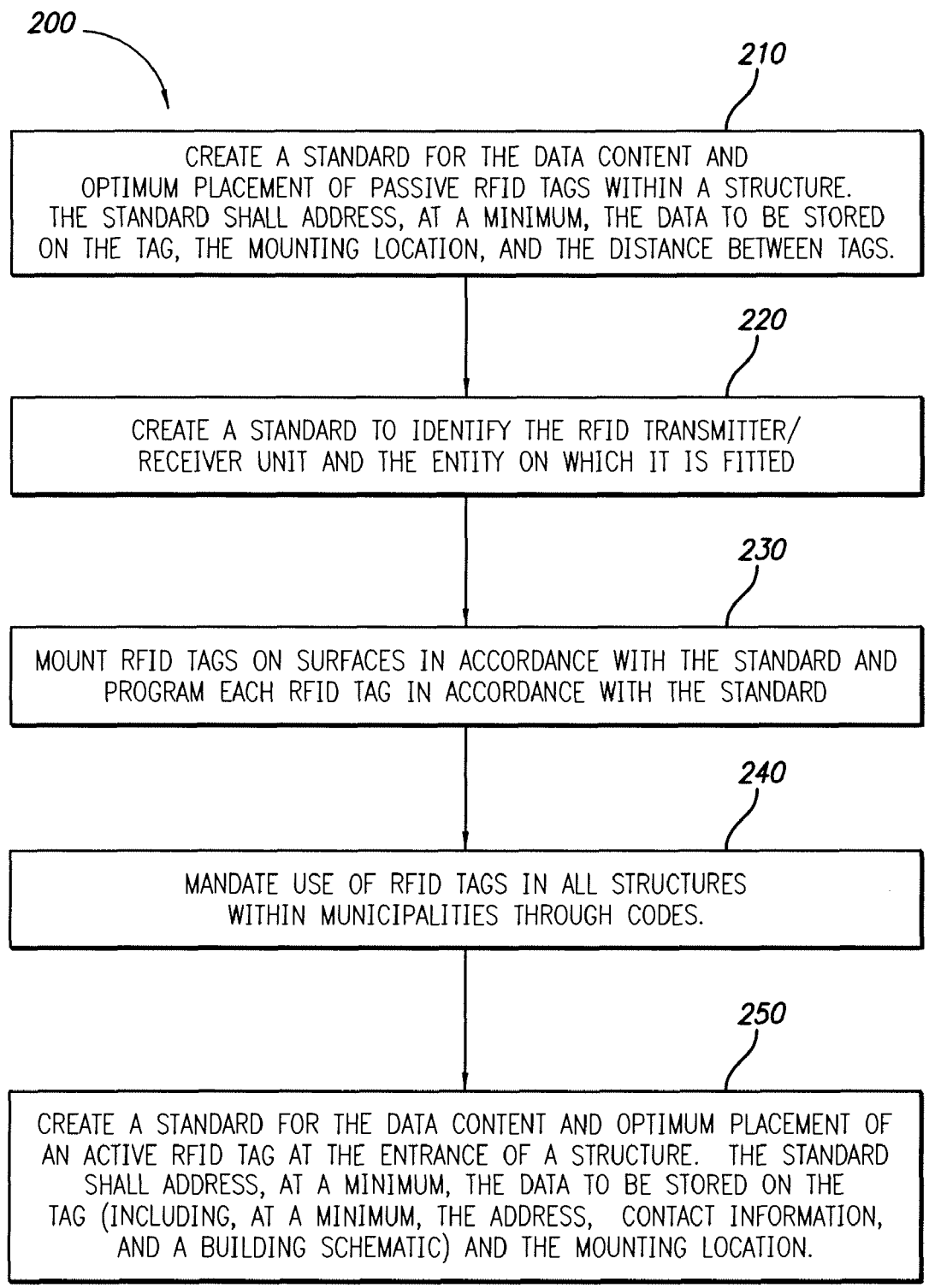
FIG. 6 is a flowchart illustrating an example method for standardizing RFID function and location for the RFID system, in accordance with the principles of the present invention.

Referring to FIG. 6, a method 200 for standardizing RFID function and location for the RFID system of the invention will now be described. Initially, step 210 involves creating a standard for the data content and optimum placement of passive RFID tags 130 within a structure. At a minimum, the standard should address the data to be stored on the tag 130, the mounting location of the tag 130 and the distance between tags 130. Step 220 involves creating a standard for identifying the RFID transmitter/receiver unit 110 and the entity (or person) on which the unit 110 is fitted. This step may involve programming each RFID transmitter/receiver unit 110 to identify the individual, asset or entity to which it will be attached. Subsequently, step 230 involves mounting a plurality of RFID tags 130 on surfaces of the structure in accordance with the standard and programming each RFID tag 130 in accordance with the standard (i.e., using an RFID transmitter/receiver unit 110 to program the location data into the tags 130). According to some embodiments of the invention, the method may further entail the steps of: (1) mandating the use of RFID tags in all structures of a particular municipality (step 240); and/or (2) creating a standard for the data content and optimum placement of an RFID tag 130 at the entrance of a structure (step 250). This standard addresses the mounting location and the data to be stored on the tag, including the address, contact information, and a building schematic.

Figure 7:
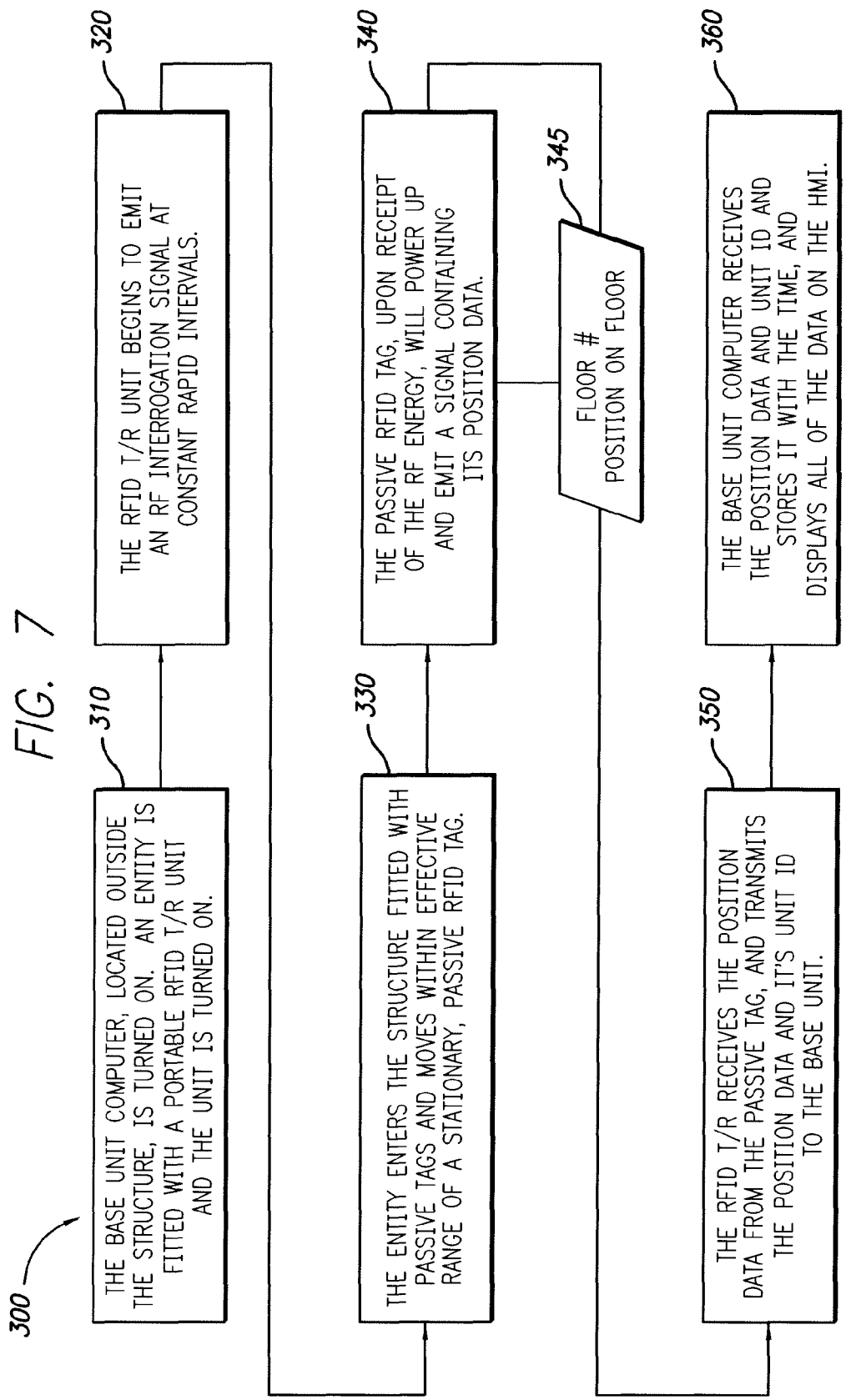
FIG. 7 is a flowchart illustrating an example method for data transmission from a passive tag to the RFID transmitter/receiver and to the base unit, in accordance with the principles of the present invention.

Referring to FIG. 7, a method 300 for data transmission from a passive tag 130 to an RFID transmitter/receiver unit 110 and to the base unit computer 120 will now be described. In step 310, the base unit computer 120 (which may be located inside or outside of the structure) is turned on and an entity (or person) is fitted with a portable RFID transmitter/receiver unit 110. In step 320, the portable RFID transmitter/receiver unit 110 emits an RF interrogation signal at constant, predetermined and rapid intervals. Step 330 involves the entity entering the structure fitted with passive RFID tags 130 and moving within the effective range of a stationary RFID tag 130. Upon receipt of the RF energy by the RFID tag 130, the method 300 proceed to step 340, wherein the passive tag 130 powers up and emits a signal 345 (or a series of signals) containing the location data, which may include, e.g., the floor number and location within the floor, latitude, longitude, and altitude, or other location information, such as a tag serial number that may be mapped to a location. For example, in one embodiment information about location based on tag serial number may be stored in a database. When a tag serial number is received this location information may be looked up in the database.

This may occur, for example, at an interrogator, at a base unit, or where ever the tag serial number is received and a copy of the data base is available. The tag number may be received by a device that contains the database either directly from an RFID tag or it may be transmitted from another device. For example an interrogator may transmit an RFID tag serial number to a base unit that includes a copy of the database. In step 350, the RFID transmitter/receiver unit 110 receives the location data from the passive tag 130, and transmits the location data and its unit ID to the base unit 120. In step 360, the base unit computer 120 receives the location data and unit ID, stores this information with the time, and displays all of the data on the HMI.

Figure 8:
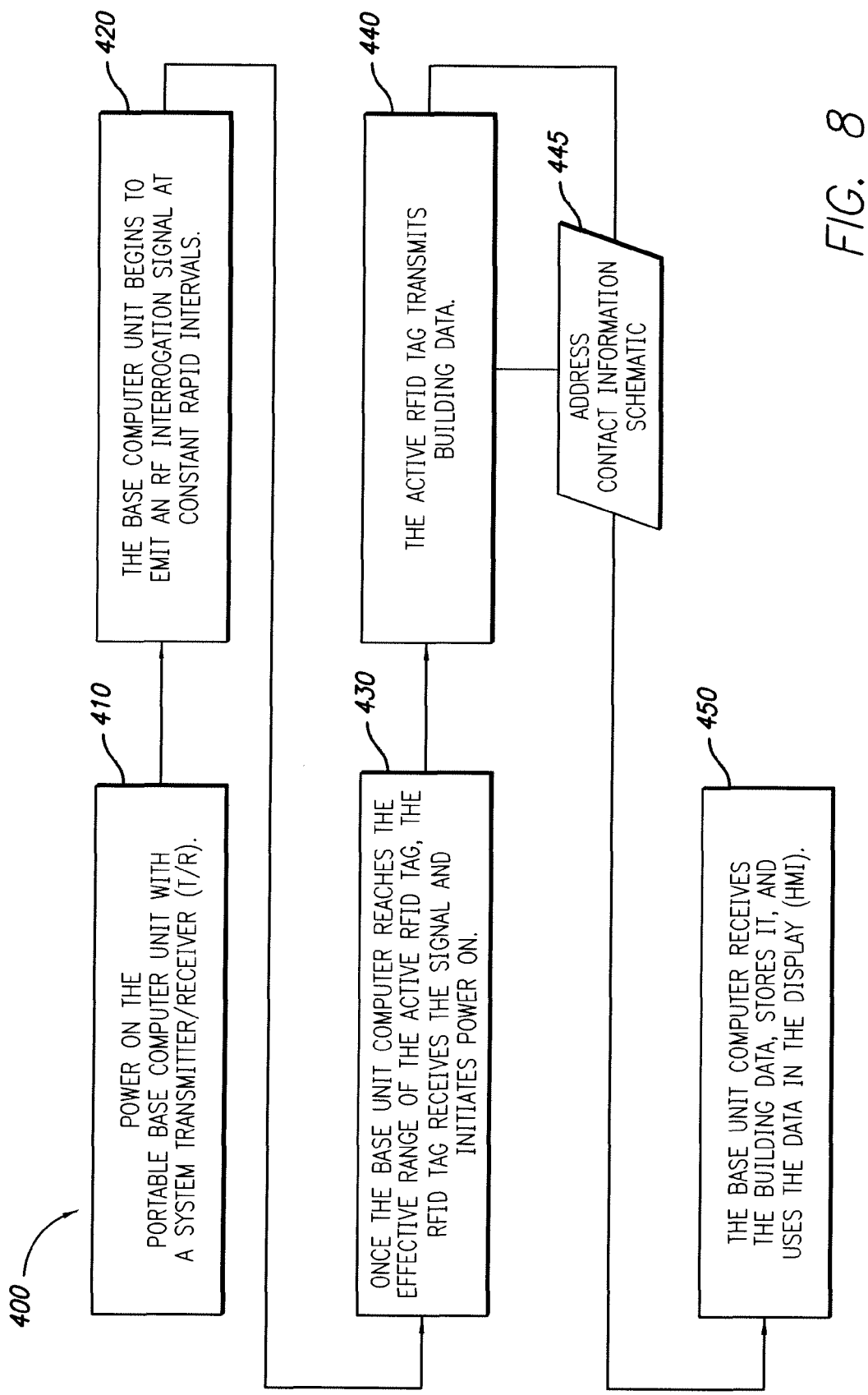
FIG. 8 is a flowchart illustrating an example method for downloading building data from an active RFID tag to the base unit computer, in accordance with the principles of the present invention.

Referring to FIG. 8, a method 400 for downloading building data from an active RFID tag 130 to a base unit computer 120 having a system transmitter/receiver will now be described. Step 410 involves powering on the portable base unit 120. In step 420, the base computer 120 begins to emit an RF interrogation signal at predetermined, constant, rapid intervals. Once the base computer 120 enters the effective range of the active RFID tag 130, the method proceed to step 430, wherein the active tag 130 receives the signal and powers on. In step 440, the active RFID tag 130 transmits building data in the form of a signal 445 (or a series of signals). For example, the building data may include without limitation, the address of the building, contact information, and a schematic of the building. In step 450, the base unit computer 120 receives the building data, stores the building data, and displays the building data on the GUI.

Figure 9:
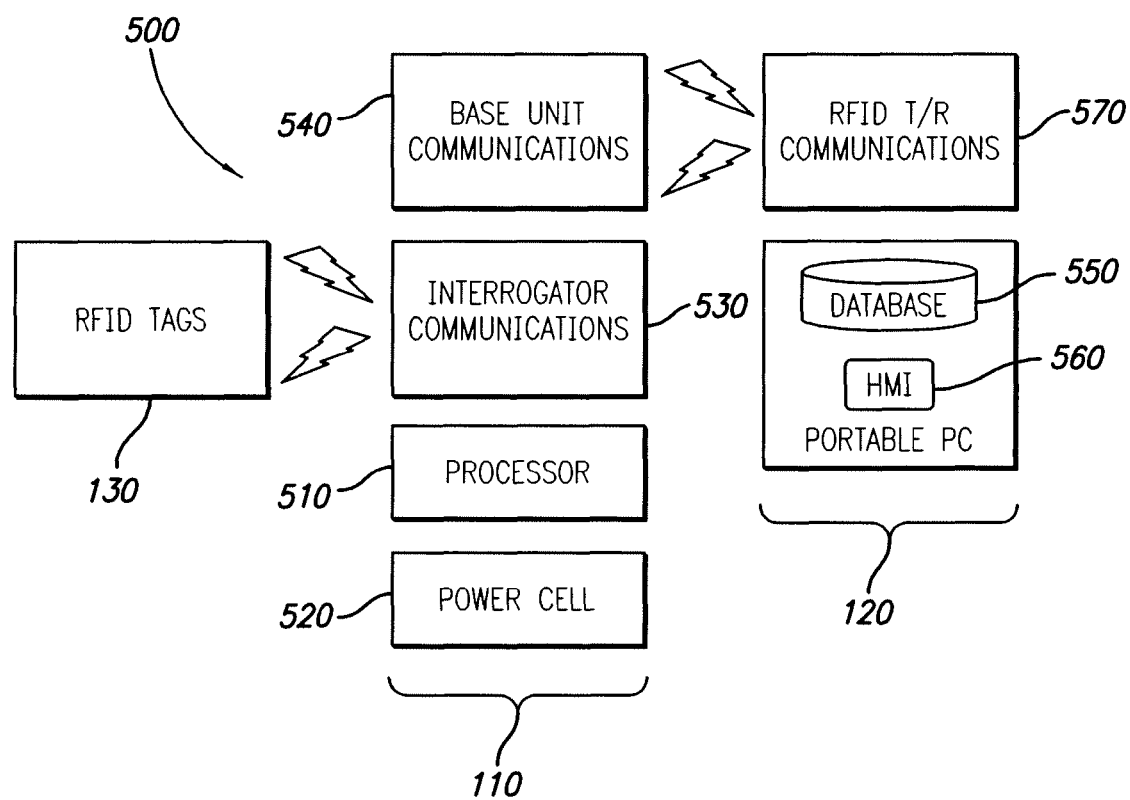
FIG. 9 is an exemplary block diagram illustrating the major components and radio wave communication between the components of the RFID system of the invention.

FIG. 9 is an exemplary block diagram 500 of the major components illustrating radio wave communication between the components of the RFID system 100, including RFID tags 130, RFID transmitter/receiver 110 and base unit computer 120. The portable RFID transmitter/receiver 110 comprises a processor 510, a power cell 520, interrogator communications 530 for interrogating the RFID tags 130, and base unit communications 540 for sending data to the base unit computer 120. The base unit 120 comprises a portable computer including at least one database 550, an HMI 560, and RFID transmitter receiver communications 570 for receiving data from the portable RFID transmitter/receiver 110. As would be understood by those of ordinary skill in the art, many additional system configurations are possible without departing from the scope of the invention.

Figure 10:
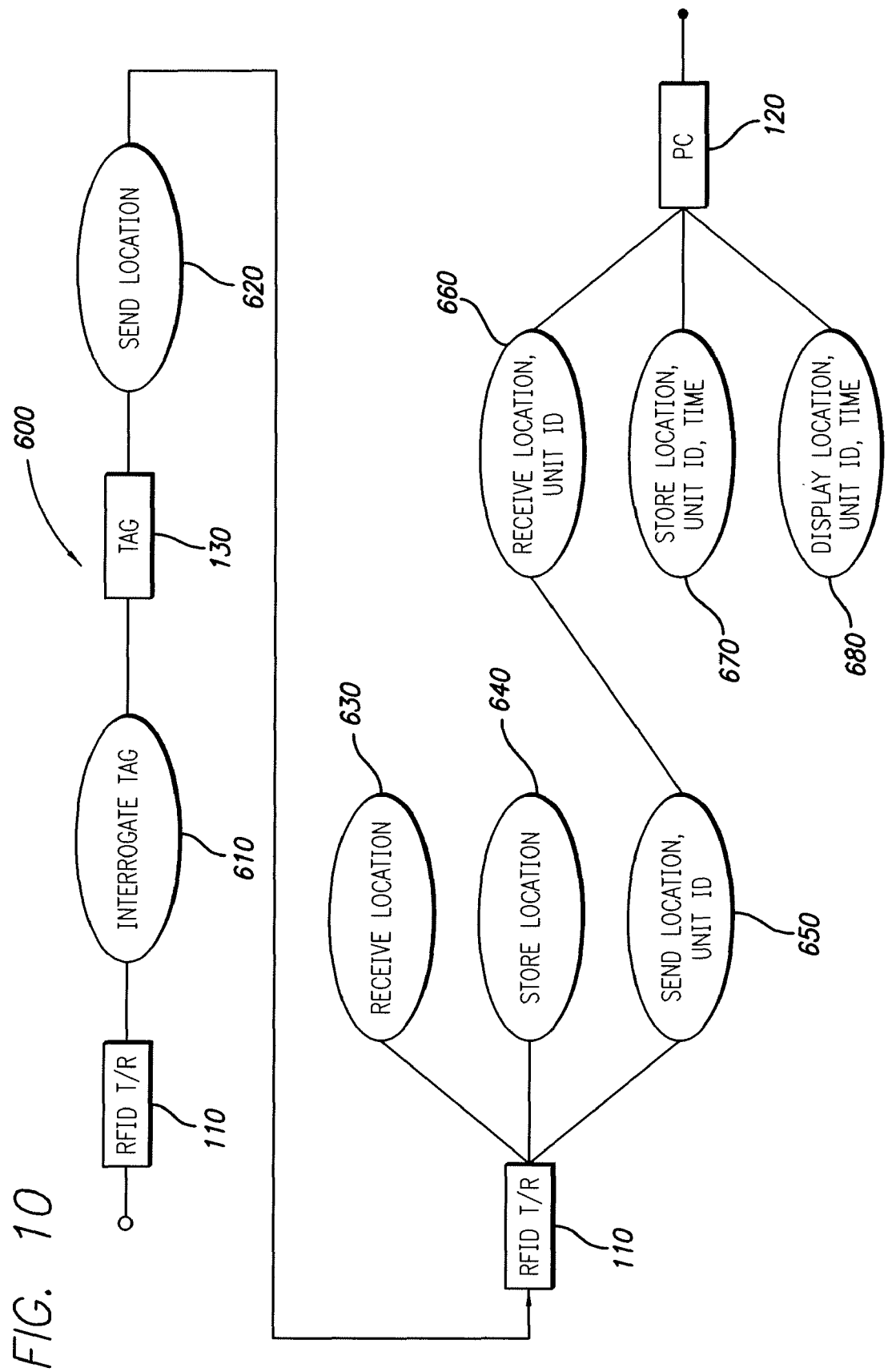
FIG. 10 is an exemplary process flow diagram illustrating process communication within the RFID system of the invention.

FIG. 10 is an exemplary process flow diagram 600 illustrating process communication within the RFID system 100 of the invention. In particular, the RFID transmitter/receiver 110 interrogates an RFID tag 130 (process 610), and, in response, the RFID tag 130 sends its location and RFID tag unit identification to the RFID transmitter/receiver 110 (process 620). Upon receiving the location information (process 630), the RFID transmitter/receiver 110 stores the location (process 640) and sends the location and RFID tag unit identification to the base unit computer 120 (process 650). The base unit 120 receives the location and RFID tag unit identification (process 660), stores the location, RFID tag unit identification and the time of the data entry (process 670), and displays the location, RFID tag unit identification and the time of the data entry (process 680). Other process flow arrangements are possible without departing from the scope of the invention.

The present invention has been described above in terms of presently preferred embodiments so that an understanding of the invention may be conveyed. However, there are other embodiments not specifically described herein for which the invention is applicable. Therefore, the invention should not be seen as limited to the forms shown, which is to be considered illustrative rather than restrictive. For example, the systems and methods described herein have been described with respect to example embodiments wherein RFID tags 130 are disposed at predetermined intervals within a structure. As would be understood by those having ordinary skill in the art, in other embodiments, RFID tags 130 may be disposed at intervals that are not predetermined. Further, the RFID tags 130 do not have to be placed at a particular interval. Additionally, the distance between RFID tags 130 does not have to be predetermined or constant. The locations may be determined after the RFID tags 130 have been placed. The placement of one or more RFID tags 130 is all that is necessary. As long as the location of an RFID tag is known, an entity may be located if it is within the range of the particular RFID tag 130.

Generally, the more accurately the location of an RFID tag 130 is known, the more precisely an entity may be located. As the range of the RFID reader on the entity increases, the accuracy may decrease because the RFID reader may determine that the entity is located at a tag that is actually some distance away from the tag. In some embodiments of the invention, accuracy may be improved by the addition of more RFID tags 130 such that the predetermined distance between RFID tags 130 is reduced. Accordingly, as would be understood by those of ordinary skill in the art, the "exact location" of an entity being located is subject to the accuracy limitations of the systems and methods described herein.

The present invention provides systems and methods for tracking entities (e.g., people, things), wherein the entities may be tracked as they move, both inside and outside of structures. The structures may be terrestrial (e.g., buildings) and subterranean (e.g., mines, subways). The location of entities that are not moving (e.g., at least temporarily still) may also be determined. Location, or tracking, data may be integrated with other relevant data, including without limitation, (i) ancillary tracking systems (e.g., GPS, acoustic homing), (ii) local environmental conditions, (iii) local infrastructure (e.g., electrical wiring, plumbing, (iv) hazardous material), (v) personal data (e.g., temperature, heart rate), and (vi) geospatial support data including maps, images and features (e.g., roads, bridges, railroads, communication lines). In some embodiments infrastructure data may include national, state, local, or tribal infrastructure data.

In one embodiment the data may be observed almost anywhere on Earth through connectivity with the internet or by wireless communication such as satellite, cellular, or other wireless communication systems, including combinations of multiple communication systems. Observers may use multiple methods for data presentation. For example, the collection of interior positioning system ("IPS"), exterior position system ("EPS"), or both, may be provided by a web based service which may be used by subscribers. In some embodiments, the location information may be used in conjunction with mapping services, for example Google Earth, Microsoft Virtual Earth, Google Maps, Yahoo Maps, or other Mapping services. In another embodiment the mapping information may be integrated into the web based service.

It will be understood that IPS will generally refer to the positioning system for inside a structure, mine, parking garage, etc., (e.g., an RFID based system) while EPS will generally refer to the position system for outside, (e.g., GPS). These terms are not intended to be limiting, however. For example, an RFID system may be used outside (e.g., by attaching RFID tags to the outside of a building), and in some cases GPS may be able to be used inside, e.g., near windows, skylights, openings, etc.

The systems and methods described herein may be implemented in many different types of devices. For example, presentation devices may include SmartPhones, PDAs, laptops, personal computers and thin client browsers. Other presentation devices may include local display of data where presentation services are included in the Interrogator Relay Unit ("IRU") or Smart IRU.

Figure 11:
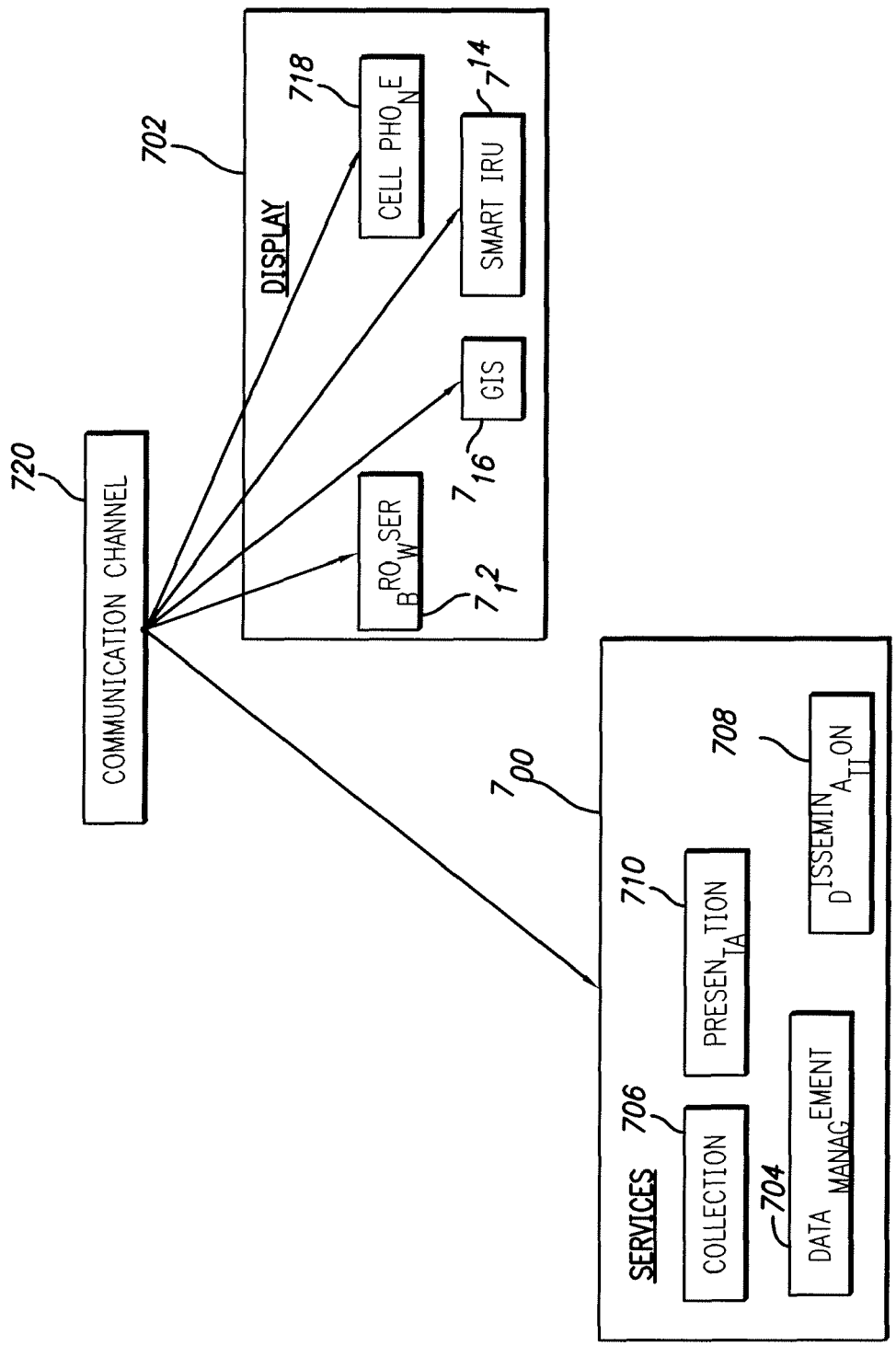
FIG. 11 is a diagram illustrating the systems and methods described herein from a service view perspective and a device view perspective.

Referring now to FIG. 11, the systems and methods described herein will now be discussed from a service view perspective 700 and a device view perspective 702. In particular, the service view 700 illustrates the architectural concepts, whereas the device view 702 illustrates operational concepts and potential implementations or embodiments. In other words, the service view 700 depicts various systems and methods described herein from the perspective of the services, while the device view 702 depicts various systems and methods described herein in terms of different example devices that may be employed. It will be understood that these are not the only devices that may be used to implement the systems and methods described herein. It will be further understood that the systems and methods described herein may, in some cases, be useful for providing services in addition to or in place of the example services discussed.

In the service view perspective 700, the architecture is broken down into four elements, including data management 704, collection 706, dissemination 708, and presentation 710. Conceptually, these elements could be services in a service-oriented architecture ("SOA"), where functionality and data flow are orchestrated by workflow middleware. The device view 702 may include different implementations or embodiments of elements of the service view 700. The spectrum of devices may range from a simple browser 712 for situational awareness to a smart IRU 714 that interrogates, relays location and other data to a base unit and also displays results locally to the host. In addition, the device view 702 may include a GIS 716 and/or a cell phone 718. Data can be transmitted and received between various components 712, 714, 716, and 718 of the display 702 and the services 700 using communication channel 720.

Figure 12:
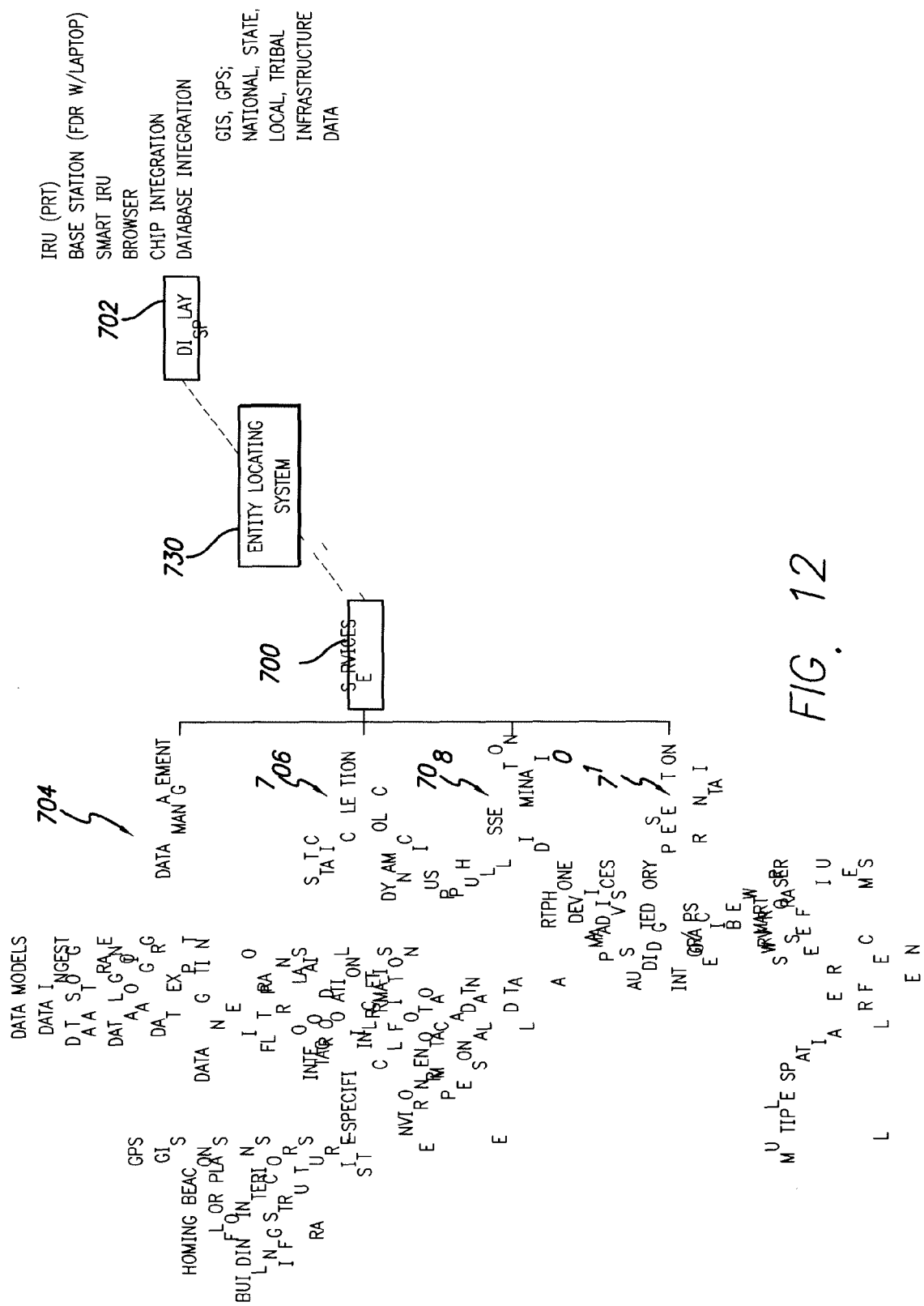
FIG. 12 is a diagram illustrating an example embodiment of the entity location system in accordance with the service view perspective and the display view perspective of FIG. 11.

FIG. 12 is a diagram illustrating an example embodiment of entity locating system 730. FIG. 12 further illustrates the service view perspective 700 and the display view perspective 702 of FIG. 11. The diagram includes examples of data management 704, collection 706, dissemination 708, and presentation 710. Data management 704 may include (i) data models, (ii) data ingest, (iii) data storage, (iv) data logging (archiving), (v) data export, and (vi) data integration. Data models may define the entities and their relationships relevant to the systems and methods described herein. Data models may further provide a common vocabulary for integrating data from multiple sources. Conceptual, Logical and Physical data models are typically required for database implementation.

With further reference to FIG. 12, data ingest may be defined as the process of importing data from sources into a database or other data storage. In one embodiment, the database may be represented by a physical data model. In another embodiment the data storage may include persisting data in tables in a database. Data logging may comprise using a database to persist real-time data for the purpose of post-operation review or simulation. In one embodiment, data integration may include the process of combining disparate, but related, data from multiple sources. Integration may be mediated by employing a unifying data model.

Another aspect of data management 704 comprises data integration. During integration, data from multiple sources may be combined using a common data model. Potential data sources may include without limitation, (i) GPS, (ii) Geographic Information System ("GIS") data, (iii) homing beacons, (iv) building floor plans and other 2-dimensional and 3-dimensional renderings of building interiors, and (v) infrastructure data. GIS data may include, but is not limited to maps, images, spatially, and referenced representations of roads, railroads, buildings. Further, GIS data may include any combination of natural and cultural features. Infrastructure data of interest may include identification and location of hazardous materials, building electrical system details, building plumbing details, etc. This infrastructure data may be of interest to, for example, fire fighters, police, contractors, etc.

Data collection 706 may include static components and/or dynamic components. Static data describes the working (operational) environment, and is constant, or near-constant, with little or no change. By way of example, static data may comprise (i) tag locations, (ii) IRU locations, (iii) floor plans, (iv) interior details, (v) site-specific data, and (vi) other forms of static data. IRU locations may be displayed in tabular form. Floor plans and interior details provide more context for presentation of tracking data. Site-specific data may include building infrastructure information such as electrical wiring and plumbing data, locations of hazardous material, and/or other information relevant to operations are also included.

With continued reference to FIG. 12, dynamic data may include time-varying data collected during operations, such as (i) IRU location, (ii) environmental data, (iii) personal data, (iv) physiological data, (v) equipment data, and (vi) other types of dynamic data. IRU location may be considered dynamic because an IRU will generally move from time to time. IRU location may be indicated by tag response to interrogation, or the IRU location may be determined using a supplemental location determination device, such as a GPS receiver. The supplemental location determination device may be internal to the IRU or physically coupled to the IRU in any number of ways. Environmental data may include, e.g., temperature, humidity, ambient light, atmospheric pressure, ambient noise, carbon dioxide concentration (and other gases), and/or other data indicative of environmental conditions. The environmental data may be included in the tag response. Personal data, physiological data and/or personal equipment data may also be included in the IRU data stream. Personal data may include name, age, employer, occupation, address, phone number, etc., while physiological data may include heart rate, temperature, etc. Equipment data may include data from air packs, cameras, battery packs, environmental sensors, etc. In one embodiment, this data may be multiplexed in the IRU data stream.

Dissemination of information 708 (e.g., data export) may be achieved by subscription, publication, or by viewer-initiated query. Subscription or publication is known as a "push" service because a device pushes the information out to other devices by transmitting or publishing it. A viewer-initiated query is known as a "pull" service since the viewer requests the information or pulls it from another device.

In push dissemination, clients subscribe to a specific information service. During operations, information, which may include static information, dynamic information, or both, is automatically pushed to the client. In pull dissemination, clients ask (query) for specific static information data, dynamic information data or both, on an ad hoc basis. The presentation service 710 may support user or client participation in RFID based location system operations. The presentation service 710 has three principal functions. First, it formats data for compatibility with a variety of presentation schemes: e.g., SmartPhones, PDAs, browsers, etc. Second, it integrates specific RFID based location system services or functions to provide local presentation of data (Smart IRU). Third, it adjusts data to appropriate reference frames (datum, coordinate systems) so that RFID based location system data may be integrated into geospatial settings (maps, images) for enhanced situational awareness. The presentation service 710 may be integrated with GIS 716 (e.g., maps, images, spatially referenced representations of roads, railroads, buildings, or natural and cultural features). It may also be integrated with virtual world rendering, for example, satellite images of various locations.

According to some embodiments, a personal monitoring device may be integrated into, for example, a smart phone, PDA, etc. The personal monitoring device may be integrated with GPS services and include audio advisories, e.g., audio presentation of data. The data may, in some embodiments be presented using a web browser interface 712. Additionally, data may be presented using a variety of spatial reference frames, including, for example, longitude, latitude, and altitude. Other reference frames may also be used, for example, street address, street address and office suite, street address and floor, etc. In some embodiments people may be located down to specific rooms, or even smaller areas within a room.

An interrogator receiver unit ("IRU") is a portable device for interrogating passive, active and sensing RFID tags, and communicating tag information using wireless technology to a base unit. The IRU may use an internal battery power source. In one embodiment a user may quickly attach an IRU using a clip, belt or another device as appropriate for a user's personal equipment and mission. In another embodiment, an IRU collection service may support ingests and management of dynamic and static data from tags, base units and other IRUs. In one embodiment, the IRU presentation service may display operational status such as battery level and quality of service data directly to a user. An IRU dissemination service may communicate tag and user personal and equipment data to a base unit. In one embodiment, the IRU data management service supports the ingest, storage, logging and integration of data from tags, base units and other IRUs. IRU operation may be configurable, allowing it to be programmed to operate in a variety of RF and communication modes.

A smart IRU 714 may have all of the functionality of a basic IRU in addition to the ability to present tag information and recommended courses of action ("COA") directly to the IRU user. A smart IRU 714 uses tag information, COA and other data to provide guidance to its user and to other IRUs within communication range. COA information may be loaded into a smart IRU 714 before use or down loaded to the IRU during use. An IRU chip may contain all of the functionality of a basic or smart IRU encoded on a single or set of electronic chips. Accordingly, IRU functionality may be incorporated into many different types of electronic devices. For example, the electronic chips may be used in cell phones, PDAs, GPS receivers, police or fire radios, other handheld or personal radios, and other electronic devices to provide IRU functionality. Accordingly, many different types of electronic devices may incorporate RFID transmitter/receivers that may include RFID interrogators such as IRUs to implement the systems and methods described herein.

According to the invention, a base unit may consist of hardware and software that communicates with and monitors single or multiple operating basic and smart IRUs 714 using wireless communication technologies. Base unit operation may be configurable, allowing it to be programmed to operate in a variety of RF and communication modes. Base unit software runs on computers (including but not limited to laptops) and other smart devices such as PDAs, Blackberries and other portable computer-based devices. Base unit hardware may interface to host computer devices using industry standard interfaces. Base unit dissemination service supports both push and pull requests for information from external systems, users and display devices. Base unit data management service supports the ingest, storage, logging and integration of data from RFID entity location systems and from external systems. By way of example, external systems may include GIS systems, GPS and other tracking systems and data systems used by RFID entity location system users. A complete log of data events and quality of service data is maintained for future reference.

The presentation service formats, integrates and adjusts data for display based on the user's needs and the characteristics of the display device. In addition, the presentation service allows information to be displayed in a browser adjusted for the physical size of the display. The base unit collection service ingests and manages both dynamic and static information.

The systems and methods described herein may be implemented using a computer. In one embodiment the computer may be a desktop, laptop, or notebook computer. In another embodiment the computer may be a mainframe, supercomputer or workstation. In yet another embodiment the computer may be a hand-held computing device such as a PDA, smart phone, cell phone 718, palmtop, etc. The computer may also represent computing capabilities embedded within or otherwise available to a given device.

The computer may include one or more processors, which may be microprocessors, microcontrollers, or other control logic and memory, such as random access memory ("RAM"), read only memory ("ROM") or other storage device for storing information and instructions for the processor. Other information storage mechanisms may also be connected to the computer, such as a hard disk drive, a floppy disk drive, a magnetic tape drive, an optical disk drive, a CD or DVD drive (R or RW), or other removable or fixed media drive, such as a program cartridge and cartridge interface, a removable memory (for example, a flash memory or other removable memory module) and memory slot, a PCMCIA slot and card, and other fixed or removable storage units and interfaces that allow software and data to be transferred from the storage unit to the computer.

The computer may also include a communications interface that may be used to allow software and data to be transferred between the computer and external devices. Examples of the communications interface may include a modem or softmodem, a network interface (such as an Ethernet, network interface card, or other interface), a communications port (such as for example, a USB port, IR port, RS232 port or other port), or other wired or wireless communications interface. Software and data transferred via the communications interface are carried on signals, which may be electronic, electromagnetic, optical or other signals capable of being received by a given communications interface. The signals may be provided to the communications interface using a wired or wireless medium. Some examples of a channel may include a phone line, a cellular phone link, an RF link, an optical link, a network interface, a local or wide area network, the internet, and other communications channels.

In this document, the terms "computer program medium" and "computer usable medium" are used to generally refer to media such as, for example, the memory, storage unit, media, and signals on a channel. These and other various forms of computer usable media may be involved in carrying one or more sequences of one or more instructions to the processor for execution. Such instructions, generally referred to as "computer program code" (which may be grouped in the form of computer programs or other groupings), when executed, enable the computer to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more," or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future, Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for locating an entity within and outside of a structure using an RFID system including a plurality of portable units, a portable unit comprising a storage, a unique identity, and an RF transmitter/receiver transported by the entity within the structure, a base unit comprising an RF transmitter/receiver and a display, and a plurality of passive RFID tags, the method comprising the steps of:
the RF transmitter/receiver recording a location of an RFID tag;
the base unit storing the location of the RFID tag in the storage;
a supplemental location determination device determining the location of the entity; and
the RF transmitter/receiver broadcasting the identity of the unit, the location of the RFID tag and the location of the entity to the base unit, which maintains a log of the identity of the unit, the location of the RFID tag and the location of the entity, determines the location of the entity from the location of the RFID tag, determines the identity of the entity from the identity of the unit, and maintains a log of the location the entity;
wherein the RFID tags contain unique location information encoded according to a predetermined standard;
wherein the RFID tags are disposed at predetermined intervals within the structure determined according a predetermined standard of placement;
wherein the base unit transmits an interrogation signal to an active RFID tag and receives a schematic of the structure;
wherein the base unit displays the schematic on the display and displays the location of the portable RF transmitter/receiver, the identity of the entity, and the log overlaid on the schematic.

2. The method of claim 1, wherein the supplemental location determination device comprises a global positioning system receiver.

3. The method of claim 2, wherein the global positioning system receiver is coupled to the RF transmitter/receiver.

4. The method of claim 1, further comprising the base unit providing additional management and data presentation capabilities.

5. The method of claim 4, wherein the additional data management capabilities comprise at least one of data models, data ingest, data storage, data logging, data export, or data integration, and wherein the additional presentation capabilities comprise formatting data, integrating specific RFID based location system services, and adjusting data to appropriate reference frames.

6. An RFID system for locating an entity within and outside of a structure, the system comprising:
a plurality of portable units, a portable unit comprising a storage, a unique identity, and an RF transmitter/receiver transported by the entity within the structure;
a base unit comprising an RF transmitter/receiver and a display; and
a plurality of passive RFID tags;
wherein the RF transmitter/receiver records a location of an RFID tag and the unit stores the location of the RFID tag in the storage;
wherein the portable RF transmitter/receiver further comprises a supplemental location determination device configured to receive supplemental GPS location data from GPS satellites;
wherein the RF transmitter/receiver records a location of the entity based on the supplemental location device, and broadcasts the location data that comprises a combination of supplemental location data and RFID tag location data to the base unit which maintains a log of the identity of the unit and the location of the RFID tag, determines the location of the entity from the location of the RFID tag, determines the identity of the entity from the identity of the unit, and maintains a log of the location the entity;
wherein the RFID tags contain unique location information encoded according to a predetermined standard;
wherein the RFID tags are disposed at predetermined intervals within the structure determined according the predetermined standard of placement;

wherein the base unit transmits an interrogation signal to the active RFID tag and receives a schematic of the structure; and wherein the base unit displays the schematic on the display and displays the location of the portable RF transmitter/receiver, the identity of the entity, and the log overlaid on the schematic.

7. The RFID system of claim 6, wherein the supplemental location determination device comprises a global positioning system receiver.

8. The RFID system of claim 7, wherein the global positioning system receiver is coupled to the RF transmitter/receiver.

9. The RFID system of claim 6, wherein the portable RF transmitter/receiver comprises an IRU or a Smart IRU.

10. The RFID system of claim 9, wherein the IRU or the Smart IRU comprises an IRU integrated on a chip.

11. The RFID system of claim 6, wherein the base unit comprises a laptop configured with a browser and coupled to a database that comprises at least one of GIS information, GPS information, national infrastructure data, state infrastructure data, local infrastructure data or tribal infrastructure data.

12. The RFID system of claim 6, wherein the RFID tag is embedded in a construction material of the structure.

13. The RFID system of claim 12, wherein the construction material is selected from the group comprising dry wall, floor panel, ceiling panel, frames, and concrete.

14. The method of claim 1, wherein the RFID tag is embedded in a construction material of the structure.

15. The method of claim 14, wherein the construction material is selected from the group comprising dry wall, floor panel, ceiling panel, frames, and concrete.

* * * * *